United States Patent [19]

Lichtenberg

[11] 4,160,181
[45] Jul. 3, 1979

[54] METHOD FOR GENERATING AUXILIARY ELECTRIC ENERGY ON A VEHICLE

[75] Inventor: Alfred Lichtenberg, Herzogenaurach, Fed. Rep. of Germany

[73] Assignee: Siemens Aktiengesellschaft, Munich, Fed. Rep. of Germany

[21] Appl. No.: 829,245

[22] Filed: Aug. 30, 1977

[30] Foreign Application Priority Data

Sep. 22, 1976 [DE] Fed. Rep. of Germany ....... 2642682

[51] Int. Cl.² ............................................. H02K 17/44
[52] U.S. Cl. ...................................... 310/166; 310/13; 104/148 LM
[58] Field of Search .................................. 310/12–14, 310/166; 104/148 K, 148 LM, 148 MS; 318/135

[56] References Cited

U.S. PATENT DOCUMENTS

| 2,638,347 | 5/1953 | Maggi ................................. 310/12 X |
| 3,361,081 | 1/1968 | Bliss ................................... 310/12 X |
| 3,513,338 | 5/1970 | Poloujadoff ............. 104/148 LM X |
| 3,903,808 | 9/1975 | Foldes ....................... 104/148 MS X |
| 3,904,899 | 9/1975 | Mailfert ................................... 310/12 |
| 4,020,374 | 4/1977 | Mailfert et al. .................... 310/13 X |

*Primary Examiner*—Donovan F. Duggan
*Attorney, Agent, or Firm*—Kenyon & Kenyon

[57] ABSTRACT

To generate auxiliary electric energy on a suspension vehicle, a generator is driven by a magnet pole wheel, which is set in rotation by utilizing the eddy current effect upon movement relative to an electric conductor rail.

2 Claims, 3 Drawing Figures

METHOD FOR GENERATING AUXILIARY ELECTRIC ENERGY ON A VEHICLE

BACKGROUND OF THE INVENTION

This invention relates vehicular power generating in general and more particularly to a method for generating auxiliary electric power in a generator which is arranged on a vehicle, particularly on a magnetic suspension vehicle.

A method for generating and storing electric energy on a vehicle is known, in which a propeller is set in rotation by the air resistance generated by the motion and this rotation is used to generate electric energy. Due to the attachment of the propeller, parts protruding beyond the profile of the vehicle must be tolerated.

It has also been previously proposed to provide vehicles, which are supported and guided by the electrodynamic suspension principle and are equipped with an ironless synchronous linear stator motor, with supplemental gas turbine sets in order to ensure the necessary on-board supply of the air conditioning and the cryogenic equipment.

SUMMARY OF THE INVENTION

It is an object of the present invention to make possible the generation of auxiliary electric energy on board vehicles without contact and without gas turbines.

According to the present invention, this is achieved by arranging a magnet pole wheel on the vehicle which is moved without contact relative to an electric conductor rail with the torque of the magnet pole wheel generated by utilizing the eddy current effect which is transmitted to the generator.

In contrast to a propeller drive, in this manner the generator is driven with a large driving torque even at relatively low vehicle velocities; after reaching a maximum, this torque approaches a constant value with increasing velocity.

DETAILED DESCRIPTION OF THE INVENTION

Figure 1:
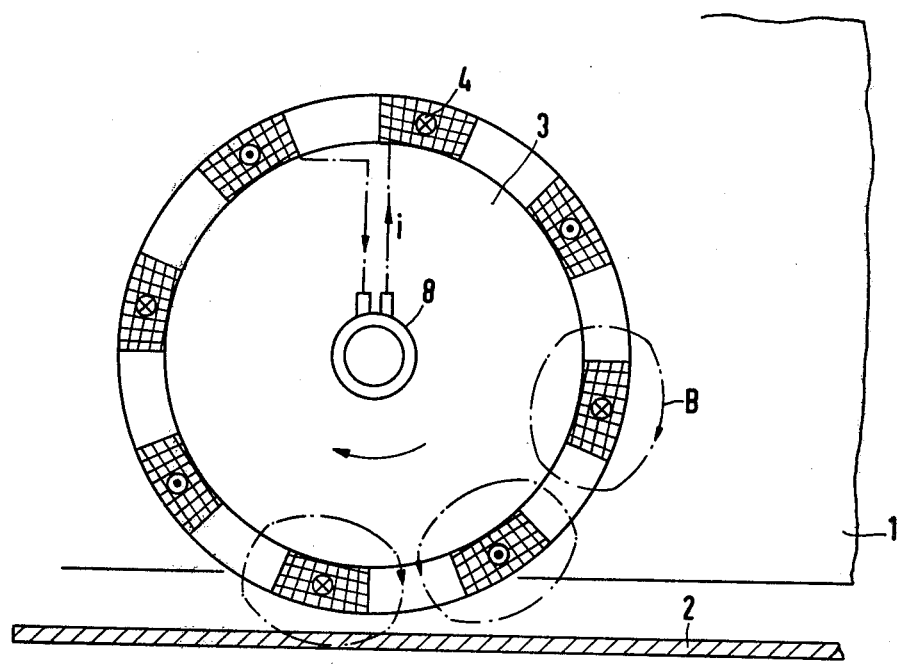
FIG. 1 is a side view of an apparatus for generating auxiliary energy on board a suspension vehicle supported in accordance with the electrodynamic principle.
Figure 2:
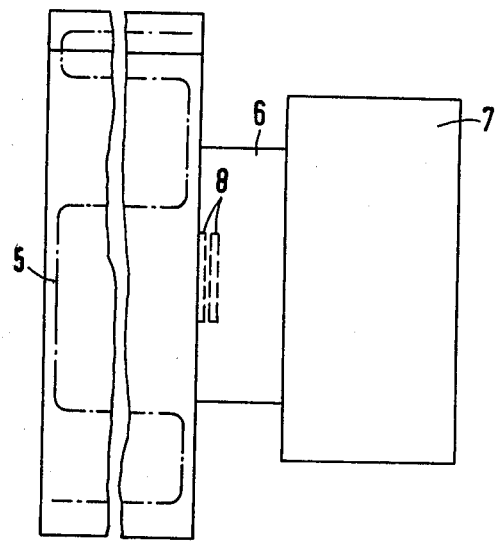
FIG. 2 is a front view of the apparatus of FIG. 1.

In FIG. 1, a suspension vehicle 1 with which electric conductor rails (rails for support without contact) are associated along the line, is shown. On the vehicle, meander-shaped d-c windings 4 with normally conducting or superconducting coils are arranged on a freely movable magnet pole wheel in such a manner that the lower edge of the magnet pole wheel is at a predetermined distance from the electric conductor rail 2 of the track. The meander-shaped direction of winding of the d-c winding 4 is indicated in FIG. 2 by the dash-dotted line 5. The magnet pole wheel 3, which is constructed without iron, is connected via a transmission 6 to an electric generator 7. The d-c excitation current i is supplied in a manner known per se via two slip rings 8.

When the vehicle 1 is in motion, the magnetic fields B on the outside of the magnet pole wheel 4 generate eddy currents in the electric conductor rail 2. Thereby, reaction forces are produced at the circumference of the wheel which result in a torque.

Figure 3:
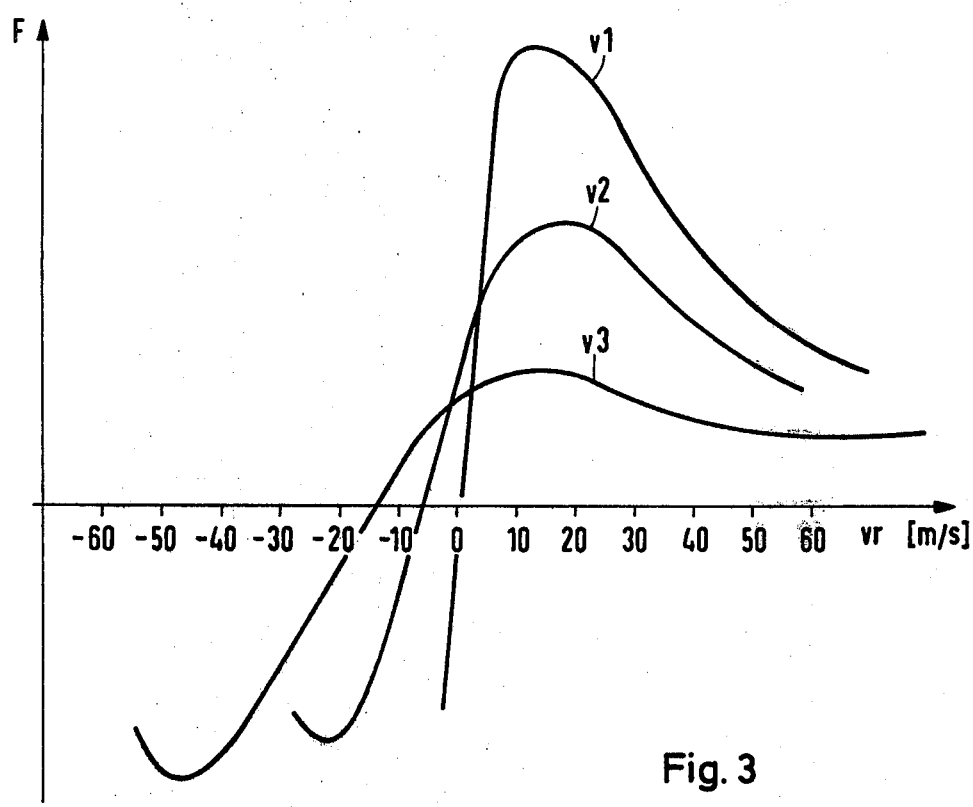
FIG. 3 illustrates the circumferential force acting on the magnet pole wheel at different vehicle velocities.

In FIG. 3, the order of magnitude of the tangential force F occurring at the magnet pole wheel 3 is plotted as a function of the slip of the magnet pole wheel 3 (relative velocity vr between the magnet pole wheel and the electric conductor rail 2) for different vehicle velocities v1 to v3.

What is claimed is:

1. A method for generating auxiliary electric energy in a generator arranged on a vehicle, particularly on a magnetic suspension vehicle comprising arranging a magnet pole wheel on the vehicle such as to be disposed, without contact, opposite an electric conductor rail on the vehicle track and transmitting the torque of the magnet pole wheel produced through utilization of the eddy current effect to a generator.

2. Apparatus for generating auxiliary electric energy for a vehicle supported by an electrodynamic support system comprising:
   (a) a magnet pole wheel constructed without iron disposed in the vehicle above an electrically conducting support rail of the electrodynamic support system; and
   (b) an electric generator mechanically coupled to said magnet wheel.

* * * * *